US010870408B2

(12) United States Patent
Garnier et al.

(10) Patent No.: US 10,870,408 B2
(45) Date of Patent: Dec. 22, 2020

(54) AIRBAG DEVICE FOR A MOTOR VEHICLE, AND AIRBAG CUSHION FOR AN AIRBAG DEVICE

(71) Applicants: Sebastien Garnier, Montmain (FR); Guillaume Alenspach, Martainville Epreville (FR); Fabrice Delaunay, Hodeng Hodenger (FR); Jules Houessou, Gothenburg (SE)

(72) Inventors: Sebastien Garnier, Montmain (FR); Guillaume Alenspach, Martainville Epreville (FR); Fabrice Delaunay, Hodeng Hodenger (FR); Jules Houessou, Gothenburg (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 15 days.

(21) Appl. No.: 16/327,930

(22) PCT Filed: Aug. 25, 2017

(86) PCT No.: PCT/EP2017/071419
§ 371 (c)(1),
(2) Date: Feb. 25, 2019

(87) PCT Pub. No.: WO2018/037110
PCT Pub. Date: Mar. 1, 2018

(65) Prior Publication Data
US 2019/0225183 A1 Jul. 25, 2019

(30) Foreign Application Priority Data
Aug. 26, 2016 (DE) .................. 10 2016 010 249

(51) Int. Cl.
B60R 21/2338 (2011.01)
B60R 21/231 (2011.01)
(Continued)

(52) U.S. Cl.
CPC ........ *B60R 21/2338* (2013.01); *B60R 21/207* (2013.01); *B60R 21/23138* (2013.01);
(Continued)

(58) Field of Classification Search
CPC .............. B60R 21/207; B60R 21/2338; B60R 2021/23386; B60R 21/23138; B60R 21/23146
See application file for complete search history.

(56) References Cited

U.S. PATENT DOCUMENTS 7,992,894 B2    8/2011  Lim et al.
9,376,083 B2 *  6/2016  Yamanaka .............. B60R 21/26
(Continued)

FOREIGN PATENT DOCUMENTS

DE    102009044734 A1    2/2011
EP       2960117 A1     12/2015
(Continued)

OTHER PUBLICATIONS

International Search Report (in English and German) and Written Opinion (in German) issued in PCT/EP2017/071419, dated Nov. 21, 2017; ISA/EP.

*Primary Examiner* — James A English
(74) *Attorney, Agent, or Firm* — Stephen T. Olson; Harness, Dickey & Pierce, P.L.C.

(57) ABSTRACT

An airbag apparatus for a motor vehicle, which can be arranged on and attached to a seat frame, and which is designed to protect the head and thorax of a passenger in the event of a side impact or vehicle rollover includes a gas generator and an airbag cushion. The gas generator and the airbag cushion are connected to each other. The airbag apparatus can be arranged on and attached to a first side of
(Continued)

the seat frame. The airbag apparatus has a first traction element attached by a first end thereof to a central region of the airbag cushion.

14 Claims, 5 Drawing Sheets

(51) Int. Cl.
    *B60R 21/207*     (2006.01)
    *B60R 21/264*     (2006.01)
    *B60R 21/00*     (2006.01)

(52) U.S. Cl.
    CPC ..... *B60R 21/264* (2013.01); *B60R 2021/0006* (2013.01); *B60R 2021/0018* (2013.01); *B60R 2021/23146* (2013.01); *B60R 2021/23161* (2013.01); *B60R 2021/23386* (2013.01)

(56) References Cited

U.S. PATENT DOCUMENTS

| | | | |
|---|---|---|---|
| 2010/0194083 A1* | 8/2010 | Sugimoto | B60R 21/233 280/730.2 |
| 2011/0025027 A1 | 2/2011 | Lim et al. | |
| 2011/0049852 A1 | 3/2011 | Kibat et al. | |
| 2012/0038137 A1* | 2/2012 | Wipasuramonton | B60R 21/18 280/733 |
| 2012/0049498 A1 | 3/2012 | Wiik et al. | |
| 2012/0091697 A1 | 4/2012 | Wiik et al. | |
| 2015/0314748 A1* | 11/2015 | Mihm | B60R 21/2338 280/730.2 |
| 2015/0367804 A1* | 12/2015 | Fujiwara | B60R 21/23138 280/730.2 |
| 2016/0031407 A1* | 2/2016 | Yamanaka | B60R 21/2338 280/728.2 |
| 2016/0159306 A1* | 6/2016 | Fujiwara | B60R 21/23138 280/728.2 |

FOREIGN PATENT DOCUMENTS

| | | |
|---|---|---|
| EP | 2979934 A1 | 2/2016 |
| GB | 2322338 A | 8/1998 |
| GB | 2357999 A | 7/2001 |

\* cited by examiner

AIRBAG DEVICE FOR A MOTOR VEHICLE, AND AIRBAG CUSHION FOR AN AIRBAG DEVICE

CROSS-REFERENCE TO RELATED APPLICATIONS

This application is a 371 U.S. National Stage of International Application No. PCT/EP2017/071419, filed Aug. 25, 2017, which claims priority to German Patent Application No. 10 2016 010 249.7, filed Aug. 26, 2016. The entire disclosures of the above applications are incorporated herein by reference.

The present invention relates to an airbag apparatus for a motor vehicle, which can be arranged on and attached to a seat frame, and which is designed to protect the head and thorax of a passenger in the event of a side impact or vehicle rollover. Furthermore, the present invention relates to an airbag cushion for this airbag apparatus.

Automotive airbag apparatuses are now being widely used in modern automobiles as additional protection systems. For example, airbag apparatuses are used as a protection system for the driver of a motor vehicle, and are for this purpose preferably arranged in the steering wheel directly in front of the driver of the motor vehicle. Furthermore, airbag apparatuses are also used as a protection system for the passenger, and are preferably arranged in such a case in the dashboard in front of the passenger seat near the glove compartment. It is also a known practice to attach airbag apparatuses in the lower region of the dashboard in front of the driver's seat and the passenger seat, thereby protecting the knees and lower legs of the driver and passenger in the event of an accident.

As further supplemental protection systems, airbag apparatuses are also used for lateral protection of passengers of a motor vehicle to protect the head and thorax of a passenger in the event of a side impact or vehicle rollover. For this purpose, airbag apparatuses are mounted, for example, in the outwardly-facing side region of the backrest of the driver's seat and/or the passenger seat, or they are arranged in the roof area of the interior above the side windows to protect the passengers of the motor vehicle with an airbag cushion inflated like a curtain in the event of an accident.

These known airbag apparatuses are available in various sizes and embodiments, and are adapted to the specific, intended mounting location and/or intended use in the interior of the vehicle.

For example, an airbag apparatus for lateral protection of passengers of a motor vehicle is known from DE 10 2009 044 734, which is attached to a prespecified section of the seat frame. This known airbag apparatus has an airbag module, as well as an airbag cushion arranged folded in the airbag module. The airbag module is fastened to the seat frame by means of bolts, and further comprises a bracket which is coupled, via a first end thereof, to a prespecified section of the airbag cushion, and via a second end to the bolt. The bracket is intended to enable the airbag cushion to unfold with a prespecified length in a prespecified position when the airbag cushion is inflated.

In recent years, however, the requirements for the safety systems in motor vehicles have increased significantly—not least of all because of stricter safety regulations promulgated by the authorities responsible for motor vehicle safety. In order to achieve the highest rating for a motor vehicle from the authorities responsible for motor vehicle safety, it is now necessary to equip motor vehicles with a so-called "FCA" (Front Center Airbag). This FCA is located in the center of the vehicle between the driver's seat and a passenger's seat, preferably in the lateral region of the backrest of the driver's seat or passenger's seat facing the adjacent seat, and protects the flank or head of a person in these seats in the event of a side impact when the airbag cushion is unfolded.

However, due to the location of the FCA in the center of the vehicle, between the driver's seat and a passenger's seat, the FCA has little lateral stiffness because it is not supported on the vehicle body when inflated. The known FCA therefore only has limited lateral retention capability.

Furthermore, due to the given geometry of the seats, and the resulting limitation of the installation space, there is not sufficient installation space in the upper lateral region of the seat and in the headrest for an airbag module for an FCA. Airbag modules for an FCA can therefore be accommodated without interference only in the lower side region of the backrest, since only here is sufficient installation space available.

However, the arrangement of the airbag module in the lower lateral region of the backrest has a number of disadvantages.

Conventional airbag modules are usually constructed symmetrically, which means that the gas generator is arranged in the center and the airbag cushion is folded symmetrically towards the center. When the airbag module is deployed, the airbag cushion is thus also inflated symmetrically—that is, the airbag cushion unfolds into equal parts above and below the gas generator—which produces a stable positioning behavior for the airbag cushion. At this point, if a conventional airbag module is used with a conventional airbag cushion for an FCA, then an extra-large airbag cushion must be used, which in the unfolded and/or inflated state must reach from the installation position of the airbag module in the lower lateral region of the backrest up to above the headrest of the seat in order to protect the head of a person.

On the one hand, this extra-large airbag cushion requires a large volume, even when folded. However, the volume for installing modules in the lower lateral region of the backrest is limited, such that functional problems arise during the installation of an extra-large airbag cushion, due to the increased volume of the extra-large airbag cushion.

On the other hand, an equally large portion of the extra-large airbag cushion is unfolded and inflated downwards, since the airbag cushion in this case is symmetrically folded toward the gas generator. However, towards the floor, the space between the two seats is limited by the transmission tunnel and/or the center console, such that the lower part of the extra-large airbag cushion cannot unfold properly. This, however, influences the unfolding of the upper part of the extra-large airbag cushion, as well as its positioning relative to the head, making it impossible to ensure safe operation in this case.

To avoid the latter disadvantage, the practice is known of folding the airbag cushion and attaching it to the inflator in such a manner that it unfolds substantially asymmetrically upward from the gas generator when the gas generator is deployed and gas inflates the airbag cushion.

On the one hand, this allows using a smaller airbag cushion which requires less volume when folded, and the airbag apparatus can be mounted in the lower lateral region of the backrest of the seat where there is sufficient volume to accommodate the airbag apparatus. This also prevents the center console and/or the transmission tunnel from affecting the inflated airbag cushion.

On the other hand, however, the airbag cushion in this case has an unstable positioning behavior, since the distance from the attachment point of the airbag cushion on the seat frame to the head portion of the airbag cushion is great, and the airbag cushion is inflated asymmetrically, such that the head portion of the airbag cushion can twist and/or be displaced with respect to the intended position of use. In particular, since the airbag cushion unfolds upward and forward in the longitudinal direction of the vehicle (that is, asymmetrically with respect to the gas generator), it is possible for the airbag cushion to undergo a backward twist which leads the head portion of the airbag cushion out of the intended position of use. However, there is a risk that the heads of passengers in the front seats, in the event of a side impact or vehicle rollover, can collide. This backward twisting of the airbag cushion is mainly due to the explosive, rapid inflation of the airbag cushion, and the subsequent deflation after complete inflation.

In order to improve the positioning behavior, the practice is known—for example, from GB 2 357 999 and US 2012/0049498—of attaching one end of traction elements in the form of straps to the airbag cushion on the side of the airbag cushion facing the passenger, and attaching the other end to the seat frame. This does make it possible to improve the positioning behavior and the stiffness of the airbag cushion, since the traction elements absorb the forces applied by the passenger to this side of the airbag cushion, thereby keeping the airbag cushion in the intended position. However, this also affects the retention capacity of the airbag cushion, since the passenger of the motor vehicle can slide off the inflated airbag cushion more easily due to the traction elements arranged on the side of the airbag cushion facing the passenger.

Therefore, proceeding from this background, it is an object of the present invention to provide a simple, cost-effective, and functionally reliable airbag apparatus for a motor vehicle, which reliably protects the head and thorax of a passenger in the event of a side impact or vehicle rollover, and reliably prevents the passenger from slipping off the inflated airbag cushion. It is a further object of the present invention to provide an airbag cushion for a motor vehicle which reliably protects the head and thorax of a passenger in the event of a side impact or vehicle rollover, and reliably prevents the passenger from slipping off the inflated airbag cushion.

This object is achieved by an airbag apparatus according to claim 1, and by an airbag cushion according to claim 10. Further advantageous embodiments of the invention are the subject matter of the dependent claims.

The airbag apparatus for a motor vehicle, according to the invention, can be arranged on and attached to a seat frame and is designed to protect the head and thorax of a passenger in the event of a side impact or vehicle rollover. It has a gas generator and an airbag cushion which are connected to each other, and it can be arranged on and attached to a first side of the seat frame which faces the adjacent seat. According to the invention, and advantageously, the airbag apparatus has a first traction element which is fastened via a first end thereof to a central region of the airbag cushion. This inventive and advantageous embodiment provides for an airbag apparatus which reliably holds the airbag cushion in the intended position when it is deployed, and which prevents the passenger from slipping off the inflated airbag cushion. This then reliably prevents, on the one hand, the collision of the heads of passengers seated on adjacent seats when two passengers are transported in the vehicle. If only one passenger is transported in the motor vehicle, then he or she is reliably restrained on the seat by the inventive and advantageous embodiment of the airbag apparatus. This offers the passenger increased security, especially if the vehicle is struck on the side opposite the seat in a side impact—since in this case the passenger is reliably restrained on the seat.

In order to prevent the traction element from affecting the passenger, and to therefore prevent even the beginning of the passenger slipping off the inflated airbag cushion, the first traction element is attached, advantageously and according to the invention, by the first end thereof in a rear part of the central region of the airbag cushion. What can be considered particularly advantageous in this case is that, because of this design, the greatest part of the inflated airbag cushion is arranged in front of the first traction element, such that there is sufficient area for safely receiving and/or precisely and reliably capturing the passenger. Furthermore, this ensures that the first traction element is arranged between the passenger and the backrest of the seat—and therefore does not move between the passenger and the inflated airbag cushion device when the airbag apparatus is deployed. Therefore, with this inventive and advantageous arrangement, the first traction element does not affect the movement of the passenger which is generated by the event that deploys the airbag apparatus. As such, this reliably prevents the passenger from slipping or sliding off the inflated airbag cushion along the first traction element.

The functional reliability of the airbag apparatus and the stiffness of the airbag cushion is further improved if, according to a preferred embodiment, the first traction element is advantageously and inventively fastened by the first end thereof near to retaining means in a rear part of the central region of the airbag cushion. These retaining means may, for example, be straps which are disposed inside the airbag cushion and connect the sides of the airbag cushion to each other, to arrange the sides of the airbag cushion at a prespecified distance from each other upon inflation of the airbag cushion, thus determining the shape of the inflated airbag cushion and its rigidity. By attaching the first end of the first traction element near to these retaining means, the rigidity and the load capacity of the airbag cushion is significantly improved—as is, therefore, the functional reliability of the airbag apparatus according to the invention.

The functional reliability of the airbag apparatus and the stiffness of the airbag cushion is further improved if, according to a further preferred embodiment, the first traction element is arranged, advantageously and according to the invention, with a second end thereof on a second side of the seat frame which is opposite the first side of the seat frame and facing the outside of the vehicle. Thus, the first traction element can hold the inflated airbag cushion in the intended position and absorb the strong forces that arise when the passenger is pressed into the inflated airbag cushion by the forces arising in a side impact. As already mentioned, this is particularly advantageous if the vehicle is hit on the side opposite the seat, in a side impact, and the passenger is pressed by the forces resulting from the side impact in the direction of the inflated airbag cushion.

Furthermore, this also stabilizes the airbag cushion in the lateral direction, thereby preventing the inflated airbag cushion from hinging open and away. Thus, the inflated airbag cushion maintains its position in the intended area of use, laterally adjacent to the seat, even if the passenger is pressed into the airbag cushion, such that the reliability and functionality is further improved. The lateral stiffness of the inflated airbag cushion is thus significantly increased, even though the inflated airbag cushion is not supported on the vehicle body.

In order to further improve the functional reliability of the airbag apparatus, as well as to reliably prevent the passenger from slipping off or sliding off the airbag cushion, according to a preferred development the central region of the airbag cushion forms a recessed central region when the airbag apparatus is deployed and the airbag cushion is inflated. This inventive and advantageous recessed central region can receive the shoulder of a passenger when he or she is pushed into the inflated airbag cushion by the event causing inflation of the airbag cushion. However, the passenger is then reliably held in front of the inflated airbag cushion, and the passenger is prevented from slipping or sliding off the inflated airbag cushion. The recessed central region and/or shoulder region can be formed in various ways. For example, it can be a portion of the airbag cushion that is not inflated. Or it can be a portion of the airbag cushion that is inflated less than the surrounding areas of the airbag cushion, to form the desired thickness of the central region and/or shoulder region. The person skilled in the art is aware of the constructive designs of the airbag cushion necessary for this design, which are hereby included in the disclosure and the scope of the invention.

According to a further preferred embodiment, it is inventively and advantageously provided that a frontal region of the airbag cushion is thicker than the central region of the airbag cushion when the airbag apparatus is deployed and the airbag cushion is inflated. This further improves the functional reliability of the airbag apparatus, and reliably prevents the passenger from slipping or sliding off the inflated airbag cushion. The thick, frontal region of the airbag cushion reliably holds the passenger with the shoulder in the recessed central region, and/or in the shoulder region, such that the passenger does not slip or slide off the inflated airbag cushion.

In an advantageous development of the invention, the airbag apparatus has a second traction element and a third traction element which are each fastened by a first end thereof to the frontal region of the airbag cushion. As such, the airbag cushion can be reliably and operatively arranged, in particular if, according to a further advantageous embodiment, the second traction element and the third traction element can each be arranged and fastened by a second end thereof to the first side of the seat frame. This ensures that the inflated airbag cushion is reliably and stably attached to the seat frame and is held in the intended position, such that the reliability of the airbag apparatus is ensured.

In order to prevent the second traction element and the third traction element from affecting the passenger, and thus to prevent the passenger from slipping off and/or sliding off the inflated airbag cushion, according to a further advantageous development, the second traction element is arranged above the first traction element, and the third traction element is arranged below the first traction element. By means of this advantageous development according to the invention, the second traction element is arranged above the central region, and the third traction element is arranged below the central region, such that the central region is not covered. Thus, the central region and/or shoulder region reliably receives the passenger's shoulder, such that it does not slip or slide off the inflated airbag cushion. This ensures the functional reliability of the airbag apparatus according to the invention. The term "above" refers to the installed position of the airbag cushion in the airbag apparatus. In the installed position, the airbag cushion has a side which is oriented downward, toward the vehicle bottom, as well as a side which is oriented upward, towards the vehicle roof. The terms "above" and "below" therefore clearly define, for a person skilled in the art, the arrangement and relationship between the second and third traction elements and the first traction element. Also, the assignments, such as "central region", "frontal region", "lower region", etc., are thus sufficiently defined for those skilled in the art.

Functionally, the second traction element produces the rigidity of the upper portion of the inflated airbag cushion, such that the head of a passenger is caught and/or retained when the airbag apparatus is deployed due to an external event, and the passenger moves toward the inflated airbag cushion as a result of this external event. The first traction element and the third traction element produce the rigidity of the central and lower portions of the inflated airbag cushion, such that the body of a passenger is caught and/or retained when the airbag apparatus is deployed due to an external event, and the passenger moves towards the inflated airbag cushion as a result of this external event. The shape of the inflated airbag cushion having the recessed central region and/or shoulder region, as well as the thicker frontal region, provides excellent protection to the passenger's head, thorax and abdomen, while at the same time preventing the passenger from slipping off or sliding off the inflated airbag.

The airbag apparatus according to the invention can be attached to a first side of the seat frame by, for example, the mounting bolts arranged on the gas generator in a known manner, while the first ends of the first, second and third traction elements can be sewn, for example, to the airbag cushion in the known manner.

The second end of the second, upper traction element can also be fastened in the known manner to a first side of the seat frame by means of a fastening bolt of the gas generator, for example, while the second end of the third, lower traction element can be fastened directly to a first side of the seat frame—for example, by means of screws or other suitable fastening means. Alternatively, the second end of the third, lower traction element can also be secured to a first side of the seat frame by means of a fastening bolt of the gas generator. The second end of the first traction element can be fastened directly to a second, opposite side of the seat frame—for example, by means of screws or other suitable fastening means. Those skilled in the art are aware of the appropriate mounting options, which are hereby incorporated into the disclosure and the scope of the invention.

Thus, according to the invention, an airbag apparatus is provided in which traction elements position the inflated airbag cushion in the use position and orient the kinematics forward, thereby reducing or preventing the passenger's absorption of speed and/or energy, with a resulting displacement and/or movement of the passenger. At the same time, the recessed central region and/or shoulder region prevents the passenger from slipping or sliding off the inflated airbag cushion.

The airbag cushion according to the invention for a motor vehicle can be arranged on and attached to a seat frame and is designed to protect the head and thorax of a passenger in the event of a side impact or vehicle rollover. The airbag cushion can be connected to a gas generator and can be arranged and secured to a first side of the seat frame facing the adjacent seat. According to the invention and advantageously, the airbag cushion has a first traction element, which is fastened by a first end thereof to a central region of the airbag cushion.

This inventive and advantageous embodiment provides for an airbag cushion which is reliably held in the intended position upon deployment, and which prevents the passenger from slipping off the inflated airbag cushion. This then reliably prevents, on the one hand, the collision of the heads of passengers seated on adjacent seats when two passengers are transported in the vehicle. If only one passenger is transported in the motor vehicle, then he or she is reliably restrained on the seat by the inventive and advantageous embodiment of the airbag cushion. This offers the passenger increased security, especially if the vehicle is struck on the side opposite the seat in a side impact—since in this case the passenger is reliably restrained on the seat.

In order to prevent the traction element from affecting the passenger, and to therefore prevent even the beginning of the passenger slipping off the inflated airbag cushion, the first traction element is attached, advantageously and according to the invention, by the first end thereof in a rear part of the central region of the airbag cushion. What can be considered particularly advantageous in this case is that, because of this design, the greatest part of the inflated airbag cushion is arranged in front of the first traction element, such that there is sufficient area for safely receiving and/or precisely and reliably capturing the passenger. Furthermore, this ensures that the first traction element is arranged between the passenger and the backrest of the seat—and therefore does not move between the passenger and the inflated airbag cushion device. Therefore, with this inventive and advantageous arrangement, the first traction element does not affect the movement of the passenger which is generated by the event that deploys the inflation of the airbag cushion. As such, this reliably prevents the passenger from slipping or sliding off the inflated airbag cushion along the first traction element.

The functional reliability of the airbag cushion and the stiffness of the airbag cushion is further improved if, according to a preferred embodiment, the first traction element is advantageously and inventively fastened by the first end thereof near to retaining means in a rear part of the central region of the airbag cushion. These retaining means may, for example, be straps which are disposed inside the airbag cushion and connect the sides of the airbag cushion to each other, to orient the sides of the airbag cushion at a prespecified distance from each other upon inflation of the airbag cushion, thus determining the shape of the inflated airbag cushion and its rigidity.

By attaching the first end of the first traction element near to these retaining means, the rigidity and the load capacity of the airbag cushion is significantly improved—as is, therefore, the functional reliability.

The functional reliability and the stiffness of the airbag cushion is further improved if, according to a further preferred embodiment, the first traction element is arranged, advantageously and according to the invention, with a second end thereof on a second side of the seat frame which is opposite the first side of the seat frame and facing the outside of the vehicle. Thus, the first traction element can hold the inflated airbag cushion in the intended position and absorb the strong forces that arise when the passenger is pressed into the inflated airbag cushion by the forces arising in a side impact. As already mentioned, this is particularly advantageous if the vehicle is hit on the side opposite the seat, in a side impact, and the passenger is pressed by the forces resulting from the side impact in the direction of the inflated airbag cushion.

Furthermore, this also stabilizes the airbag cushion in the lateral direction, thereby preventing the inflated airbag cushion from hinging open and away. Thus, the inflated airbag cushion maintains its position in the intended area of use, laterally adjacent to the seat, even if the passenger is pressed into the airbag cushion, such that the reliability and functionality are further improved.

In order to further improve the functional reliability of the airbag cushion, as well as to reliably prevent the passenger from slipping off or sliding off the airbag cushion, according to a preferred development the central region of the airbag cushion forms a recessed central region when the airbag cushion is inflated. This inventive and advantageous recessed central region can receive the shoulder of a passenger when it is pushed into the inflated airbag cushion by the event causing inflation of the airbag cushion. However, the passenger is then reliably held in front of the inflated airbag cushion, and the passenger is prevented from slipping or sliding off the inflated airbag cushion. The recessed central region and/or shoulder region can be formed in various ways. For example, it can be a portion of the airbag cushion that is not inflated. Or it can be a portion of the airbag cushion that is inflated less than the surrounding areas of the airbag cushion, to form the desired thickness of the central region and/or shoulder region. The person skilled in the art is aware of the constructive designs of the airbag cushion necessary for this design, which are hereby included in the disclosure and the scope of the invention.

According to a further preferred embodiment, it is inventively and advantageously provided that a frontal region of the airbag cushion is thicker than the central region of the airbag cushion when the airbag cushion is inflated. This further improves the functional reliability of the airbag cushion, and reliably prevents the passenger from slipping or sliding off the inflated airbag cushion. The thick, frontal region of the airbag cushion reliably holds the passenger with the shoulder in the recessed central region, and/or in the shoulder region, such that the passenger does not slip or slide off the inflated airbag cushion.

In an advantageous development of the invention, the airbag cushion has a second traction element and a third traction element which are each fastened by a first end thereof to the frontal region of the airbag cushion. As such, the airbag cushion can be reliably and operatively arranged, in particular if, according to a further advantageous embodiment, the second traction element and the third traction element can each be arranged and fastened by a second end thereof to the first side of the seat frame. This ensures that the inflated airbag cushion is reliably and stably attached to the seat frame and is held in the intended position, such that the reliability of the airbag cushion is ensured.

In order to prevent the second traction element and the third traction element from affecting the passenger, and thus to prevent the passenger from slipping off and/or sliding off the inflated airbag cushion, according to a further advantageous development, the second traction element is arranged above the first traction element, and the third traction element is arranged below the first traction element. By means of this advantageous development according to the invention, the second traction element is arranged above the central region, and the third traction element is arranged below the central region, such that the central region is not covered. Thus, the central region and/or shoulder region reliably receives the passenger's shoulder, such that it does not slip or slide off the inflated airbag cushion. This ensures the functional reliability of the airbag cushion according to the invention.

The term "above" refers to the installed position of the airbag cushion. In the installed position, the airbag cushion has a side which is oriented downward, toward the vehicle bottom, as well as a side which is oriented upward, towards the vehicle roof. The terms "above" and "below" therefore clearly define, for a person skilled in the art, the arrangement and relationship between the second and third traction elements and the first traction element. Also, the assignments, such as "central region", "frontal region", "lower region", etc., are thus sufficiently defined for those skilled in the art.

Functionally, the second traction element produces the rigidity of the upper portion of the inflated airbag cushion, such that the head of a passenger is caught and/or retained when the airbag cushion is deployed due to an external event and the passenger moves toward the inflated airbag cushion as a result of this external event. The first traction element and the third traction element produce the rigidity of the central and lower portions of the inflated airbag cushion, such that the body of a passenger is caught and/or retained when the airbag cushion is deployed due to an external event, and the passenger moves towards the inflated airbag cushion as a result of this external event. The shape of the inflated airbag cushion having the recessed central region and/or shoulder region, as well as the thicker frontal region, provides excellent protection to the passenger's head, thorax and abdomen, while at the same time preventing the passenger from slipping off or sliding off the inflated airbag.

The airbag cushion according to the invention can be attached to a first side of the seat frame by, for example, the mounting bolts arranged on the gas generator in a known manner, while the first ends of the first, second and third traction elements can be sewn, for example, to the airbag cushion in the known manner. The second end of the second, upper traction element can also be fastened in the known manner to a first side of the seat frame by means of a fastening bolt of the gas generator, for example, while the second end of the third, lower traction element can be fastened directly to a first side of the seat frame—for example, by means of screws or other suitable fastening means. Alternatively, the second end of the third, lower traction element can also be secured to a first side of the seat frame by means of a fastening bolt of the gas generator. The second end of the first traction element can be fastened directly to a second, opposite side of the seat frame—for example, by means of screws or other suitable fastening means. Those skilled in the art are aware of the appropriate mounting options, which are hereby incorporated into the disclosure and the scope of the invention.

Thus, according to the invention, an airbag cushion is provided in which traction elements position the inflated airbag cushion in the use position and orient the kinematics forward, thereby reducing or preventing the passenger's absorption of speed and/or energy, with a resulting displacement and/or movement of the passenger. At the same time, the recessed central region and/or shoulder region prevents the passenger from slipping or sliding off the inflated airbag cushion.

Further advantages and features of the invention will become apparent from the following description taken in conjunction with the drawings, wherein.

Figure 1:
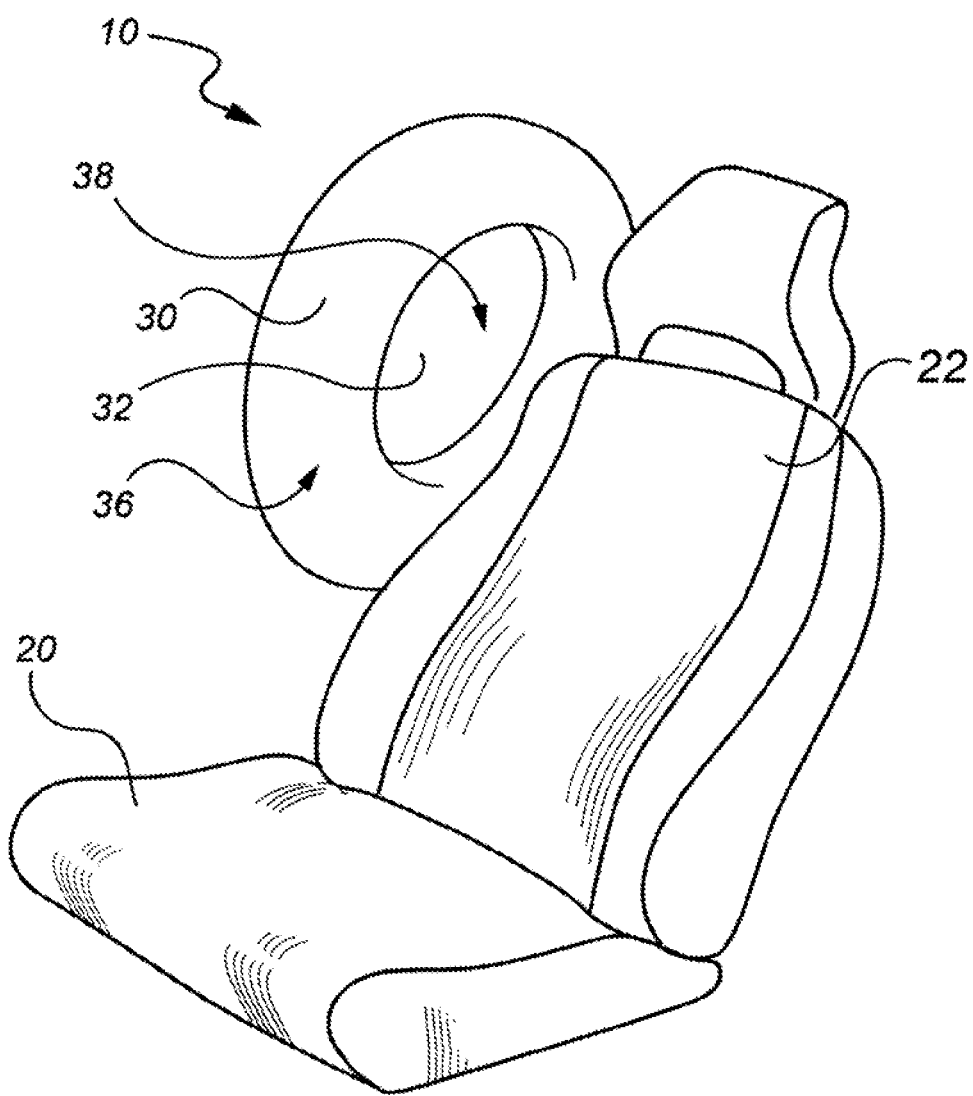
FIG. 1 shows a schematic view of the driver's seat (20) of a motor vehicle, with an airbag apparatus (10) arranged on the backrest (22)

FIG. 1 shows a schematic view of a driver's seat (20) of a motor vehicle, with a deployed airbag apparatus (10) arranged on a backrest (22). The airbag apparatus (10) has an airbag cushion (30) and a gas generator, which is not shown here and which has inflated the airbag cushion (30) in the shape illustrated. The airbag cushion (30) shown here is a so-called "FCA" (Front Center Airbag), which is located in the center of the vehicle between the driver's seat and a passenger's seat (not shown), in the lateral region of the backrest of the driver's seat (not shown) facing the adjacent seat, and protects the flank and the head of a person in these seats in the event of a side impact.

The airbag cushion (30) has a recessed central region (32) and/or shoulder region (38) for receiving the shoulder of a passenger, and a thicker frontal region (36) which prevents the shoulder from slipping out of the central region (32) and/or shoulder region (38).

The mode of operation of the airbag apparatus (10) according to the invention will now be explained in more detail below, with reference to FIGS. 2-5.

Figure 2:
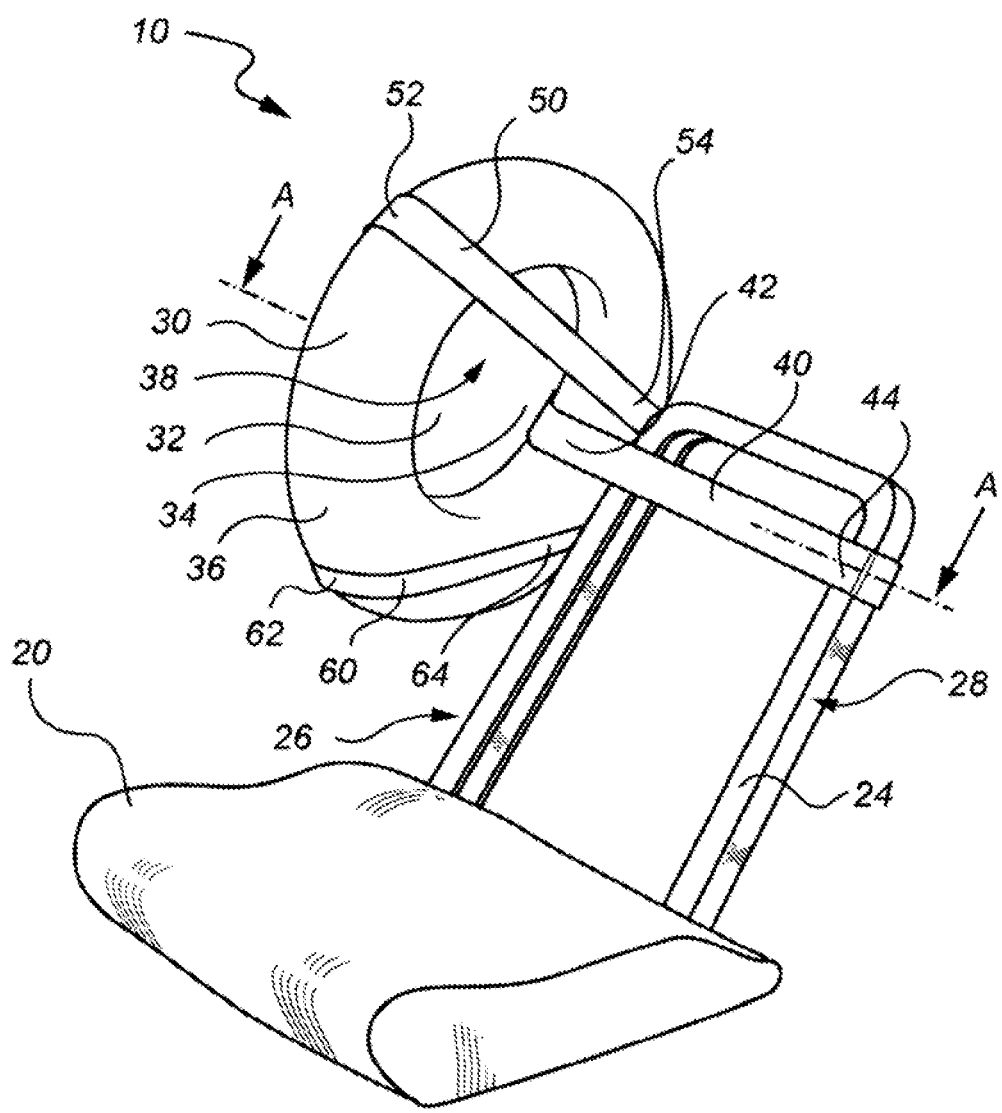
FIG. 2 shows a schematic view of the driver's seat (20) interior, which shows the seat frame (24) with the airbag apparatus (10) and the traction elements (40, 50, 60) attached to the seat frame (24)

FIG. 2 shows a schematic view of the driver's seat (20) of FIG. 1 with its interior, revealing a seat frame (24) of the backrest (22). The airbag apparatus (10) is attached and fastened to the seat frame (24) on the first side (26), facing the adjacent seat, which is not shown. The airbag apparatus (10) according to the invention is attached on the first side (26) of the seat frame (24) in this embodiment in a known manner, with the gas generator mounting bolts (not shown).

The airbag apparatus (10) has an airbag cushion (30) with a recessed central region (32) and/or shoulder region (38) and a thicker frontal region (36). A first traction element (40) is attached by a first end (42) thereof in a rear part (34) of the recessed central region (32) and/or shoulder region (38). By a second end (44) thereof, the first traction element (40) is attached to a second, opposite side (28) of the seat frame (24) facing the vehicle exterior. The second end (44) of the first traction element (40) is attached on the second side (28) of the seat frame (24) in this embodiment with screws, which are not shown.

With this inventive and advantageous embodiment, the first traction element (40) can hold the inflated airbag cushion (30) in the intended position and absorb the strong forces which arise when the passenger is pressed into the inflated airbag cushion (30) by the forces arising in a side impact. As already mentioned, this is particularly advantageous if the vehicle is hit on the side opposite the seat (20), in a side impact, and the passenger is pressed by the forces resulting from the side impact in the direction of the inflated airbag cushion (30).

Furthermore, a third traction element (50) is attached by a first end (52) thereof to a frontal region (36) of the airbag cushion (30), and by a second end (54) thereof to the first side (26) of the seat frame (24). The second end (54) of the second traction element (50) is attached on the first side (26) of the seat frame (24) in this embodiment by means of a fastening bolt of the gas generator, which is not shown.

Finally, a third traction element (60) is attached by a first end (62) thereof to a frontal region (36) of the airbag cushion (30), and by a second end (64) thereof to the first side (26) of the seat frame (24). The second end (64) of the third traction element (60) is attached to the first side (26) of the seat frame (24) in this embodiment by means of screws, which are not shown.

This inventive and advantageous embodiment ensures that the inflated airbag cushion (30) is reliably and stably attached to the seat frame (30) and is held in the intended position, ensuring the reliability of the airbag cushion (24).

Figure 3:
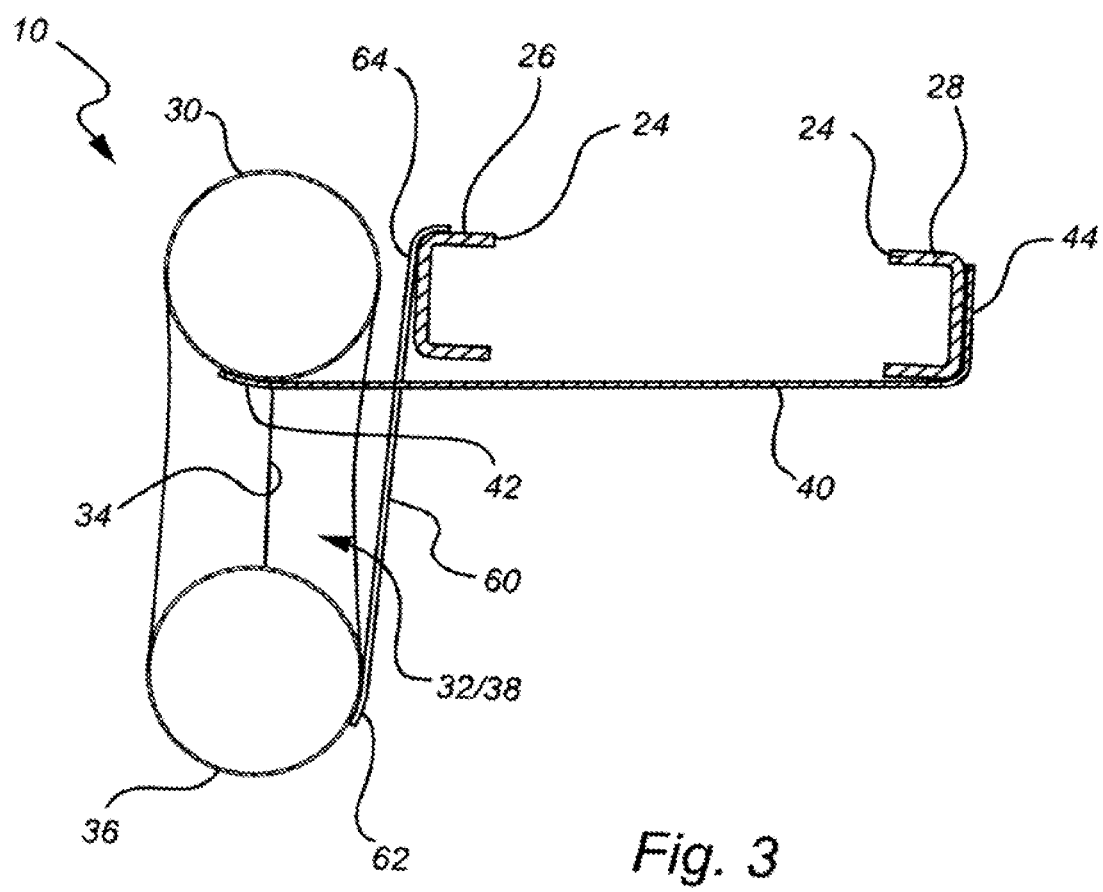
FIG. 3 shows a sectional view of a first embodiment of the airbag apparatus (10) together with the seat frame (24), cut away along line A-A in FIG. 2.

Functionally, the second traction element (50) produces the rigidity of the upper portion of the inflated airbag cushion (30), such that the head of a passenger is caught and/or retained when the airbag cushion (30) is deployed due to an external event, and the passenger moves toward the inflated airbag cushion (30) as a result of this external event. The first traction element (40) and the third traction element (60) produce the rigidity of the central and lower portions of the inflated airbag cushion (30), such that the body of a passenger is caught and/or retained when the airbag cushion (30) is deployed due to an external event, and the passenger moves towards the inflated airbag cushion (30) as a result of this external event. The shape of the inflated airbag cushion (30) having the recessed central region (32) and/or shoulder region (38), as well as the thicker frontal region (36), provides excellent protection to the passenger's head, thorax and abdomen, while at the same time preventing the passenger from slipping off or sliding off the inflated airbag (30). FIG. 3 shows a sectional view of a first embodiment of the airbag apparatus (10). The section is taken along the line A-A in FIG. 2, illustrating the view from above, as indicated by the arrows (A).

The airbag apparatus (10) comprises an airbag cushion (30), wherein the airbag cushion (30) has a central region (32) and/or shoulder region (38), as well as a thicker frontal region (36). A first traction element (40) is attached by a first end (42) thereof in a rear part (34) of the central region (32) and/or shoulder region (38). By a second end (44), the first traction element (40) is attached to a second side (28) of the seat frame (24).

Furthermore, a third traction element (60) is attached by a first end (62) thereof to a frontal region (36) of the airbag cushion (30), and by a second end (64) thereof to the first side (26) of the seat frame (24).

In the first embodiment of the airbag apparatus (10) shown here, the central region (32) and/or the shoulder region (38) is/are formed by a region of the airbag cushion (30) which is not inflated. That is, the two sides of the airbag cushion (30) lie directly one on the other in this region, and are joined together in their edge region—for example, by welding—such that no gas from the adjacent inflated regions of the airbag cushion (30) can pass into the central region (32) and/or shoulder region (38). This results in a recessed central region (32) and/or shoulder region (38) which is recessed relative to the surrounding regions of the airbag cushion (30), and which is particularly recessed with respect to the thicker frontal region (36), as can be seen in this sectional view.

This inventive and advantageous recessed central region (32) and/or shoulder region (38) can receive a passenger's shoulder when it is pressed into the inflated airbag cushion (30) by the event causing inflation of the airbag cushion (30). However, the passenger is therefore reliably held by the inflated airbag cushion (30) in front of the same, and the passenger is prevented from sliding or slipping off the inflated airbag cushion (30).

The inventive and advantageous thick frontal region (36) of the airbag cushion (30) reliably holds the passenger with the shoulder in the recessed central region (38) and/or shoulder region (30), such that the passenger does not slide or slip off the inflated airbag cushion (32).

Figure 4:
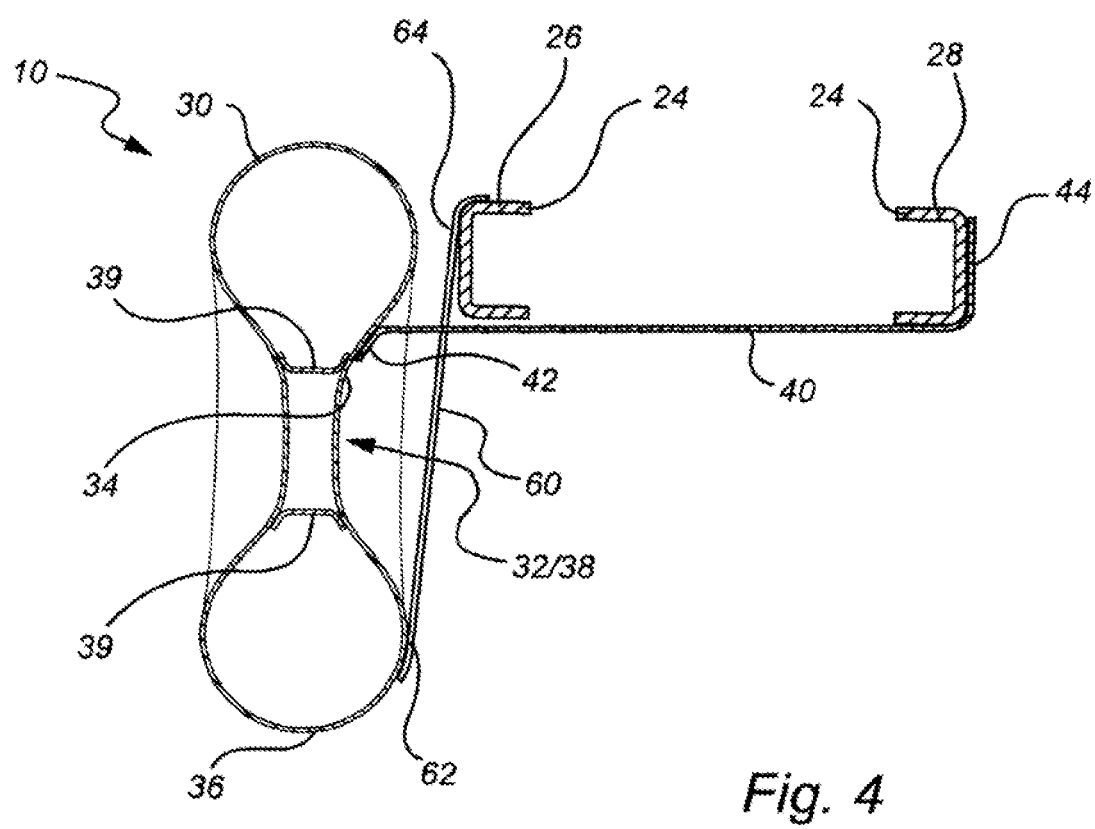
FIG. 4 shows a sectional view of a second embodiment of the airbag apparatus (10) together with the seat frame (24), cut away along line A-A in FIG. 2.

FIG. 4 shows a sectional view of a second embodiment of the airbag apparatus (10). The section is taken along the line A-A in FIG. 2, illustrating the view from above, as indicated by the arrows (A). The airbag apparatus (10) comprises an airbag cushion (30), wherein the airbag cushion (30) has a central region (32) and/or shoulder region (38), as well as a thicker frontal region (36). A first traction element (40) is attached by a first end (42) in a rear part (34) of the central region (32) and/or the shoulder region (38), near to retaining means (39). The retaining means (39) are designed in the embodiment illustrated here as straps which are arranged inside the airbag cushion (30) and connect the sides of the airbag cushion (30) to each other, to orient the sides of the airbag cushion (30) at a prespecified distance from each other upon inflation of the airbag cushion (30), thus determining the shape of the inflated airbag cushion (30) and its rigidity. By a second end (44), the first traction element (40) is attached to a second side (28) of the seat frame (24).

Furthermore, a third traction element (60) is attached by a first end (62) thereof to a frontal region (36) of the airbag cushion (30), and by a second end (64) thereof to the first side (26) of the seat frame (24).

In the second embodiment of the airbag apparatus (10) shown here, the central region (32) and/or the shoulder region (38) is/are formed by a region of the airbag cushion (30) which is likewise inflated when the airbag cushion (30) is inflated. However, the inflation of this central region (32) and/or shoulder region (39), and thus its outward expansion, is limited by the retaining means (38), resulting in a prespecified shape of the central region (38) and/or shoulder region (32). This results in a recessed central region (32) and/or shoulder region (38) which is recessed relative to the surrounding regions of the airbag cushion (30), and which is particularly recessed with respect to the thicker frontal region (36), as can be seen in this sectional view.

This inventive and advantageous recessed central region (32) and/or shoulder region (38) can receive a passenger's shoulder when it is pressed into the inflated airbag cushion (30) by the event causing inflation of the airbag cushion (30). However, the passenger is therefore reliably held by the inflated airbag cushion (30) in front of the same, and the passenger is prevented from sliding or slipping off the inflated airbag cushion (30).

The inventive and advantageous thick frontal region (36) of the airbag cushion (30) reliably holds the passenger with the shoulder in the recessed central region (38) and/or shoulder region (30), such that the passenger does not slide or slip off the inflated airbag cushion (32).

Figure 5:
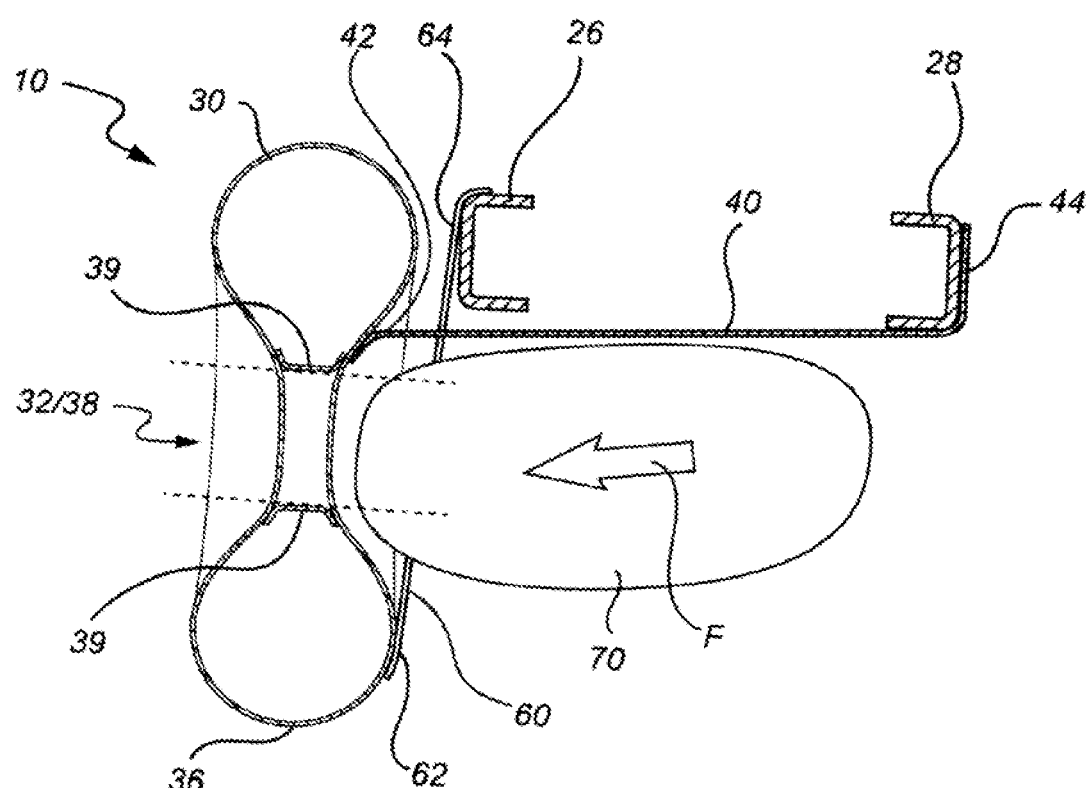
FIG. 5 shows the cutaway view of FIG. 4, with a schematic representation of the functionality of the airbag apparatus (10).

FIG. 5 schematically illustrates the mode of operation of the airbag apparatus (10) according to the invention.

FIG. 5 shows the sectional view of FIG. 4, additionally including a passenger (70) to illustrate the mode of operation of the airbag apparatus (10). Furthermore, the recessed central region (32) and/or shoulder region (38) is illustrated here by the dashed lines. Incidentally, the same parts are provided here with the same reference numerals and therefore need not be explained again.

An external event causing the airbag apparatus (10) to deploy, therefore causing inflation of the airbag cushion (30), subjects the passenger (70) to a force (F). Because of this force (F), the passenger (70) moves toward the inflated airbag cushion (30), as indicated by the arrow and/or force direction (F), and is caught by the inflated airbag cushion (30).

The shoulder of the passenger (70) in this case reaches into the recessed central region (32) and/or shoulder region (38) and is caught and held here. Continued movement of the passenger (70) in the lateral direction and/or force direction (F) is prevented by the inflated airbag cushion (30)

and/or the recessed shoulder region (38). The force applied by the passenger (70) to the airbag cushion (30) is absorbed by the first traction element (40) and directed via the same into the second side (28) of the seat frame (24).

Also, a movement of the passenger (70) forward—that is, a slipping or sliding of the passenger (70) off the inflated airbag cushion (30)—is prevented by the airbag apparatus (10) according to the invention. Since the frontal region (36) of the airbag cushion (30) is thicker than the recessed central region (32) and/or shoulder region (38), the shoulder of the passenger (60) lies against the frontal, thicker portion (36), and is prevented by the same from moving forward. The force applied by the passenger (70) to the airbag cushion (30) in this case is absorbed by the second and third traction elements (50, 60), and directed via the same into the first side (26) of the seat frame (24).

LIST OF REFERENCE NUMBERS 10 airbag apparatus
20 seat
22 backrest
24 seat frame
26 first side
28 second side
30 airbag cushion
32 central region
34 rear part
36 front region
38 shoulder region
39 retaining means
40 first traction element
42 first end
44 second end
50 second traction element
52 first end
54 second end
60 third traction element
62 first end
64 second end
70 passenger
A view A-A
F force direction

The invention claimed is:

1. An airbag apparatus in combination with a seat of a motor vehicle, the airbag apparatus comprising:
a gas generator;
an airbag cushion connected to the gas generator and arranged on a first lateral side of a seat frame of the seat, the airbag cushion deployable on the first lateral side of the seat frame in a plane extending parallel to a vehicle longitudinal direction and perpendicular to a lateral direction, the airbag cushion for protecting a head and thorax of a passenger in an event of a side impact or vehicle rollover, the airbag cushion defining a recessed central region for accommodating a shoulder of the passenger; and
a first traction element having a first end coupled to a rear side of the recessed central region and a second end coupled to the seat frame of the seat, the first traction element extending between the seat frame and the airbag cushion generally in the lateral direction when the airbag cushion is deployed.

2. The apparatus according to claim 1, wherein the recessed central region is defined by first and second internal straps and the first traction element is attached by the first end thereof proximate one of the first and second internal straps.

3. The apparatus according to claim 1, wherein the first traction element the second end of the first traction element is attached to a second lateral side of the seat frame and the first traction element laterally extends across the seat frame from the first lateral side to the second lateral side.

4. The apparatus according to claim 1, wherein the airbag cushion includes a frontal region, the frontal region having a thickness greater than the central region of the airbag cushion when the airbag apparatus is deployed and the airbag cushion is inflated.

5. The apparatus according to claim 1, further comprising a second traction element and a third traction element, both of the second and third traction elements attached by to a frontal region of the airbag cushion.

6. The apparatus according to claim 5, wherein the second traction element and the third traction element are arranged on and attached to the first side of the seat frame.

7. The apparatus according to claim 5, wherein the second traction element is arranged above the first traction element, and the third traction element is arranged below the first traction element.

8. An airbag apparatus for attachment to a seat frame of a vehicle seat in combination with the vehicle seat, the airbag apparatus comprising:
an airbag cushion deployable on a first lateral side of the seat frame in a plane extending parallel to a vehicle longitudinal direction and perpendicular to a lateral direction, the airbag cushion including a recessed central region for accommodating a shoulder of a vehicle passenger; and
a first traction element having a first end attached to the central region of the airbag cushion and a second end attached to a second lateral side of the seat frame, the first traction element extending In the lateral direction across the seat frame from the recessed central region of the airbag cushion to the second lateral side.

9. The airbag cushion according to claim 8, wherein the first traction element is attached by the first end in a rear part of the recessed central region of the airbag cushion.

10. The airbag cushion according to claim 9, wherein the first traction element is attached by the first end thereof near to a first internal strap in a rear part of the recessed central region of the airbag cushion, the first internal strap cooperating with a second internal strap to define the recessed central region.

11. The airbag cushion according to claim 8, wherein the airbag cushion includes a frontal region having a thickness greater than the recessed central region of the airbag cushion when the airbag cushion is inflated.

12. The airbag cushion according to claim 8, wherein the airbag cushion has a second traction element and a third traction element, each of the first and second traction elements attached to a frontal region of the airbag cushion.

13. The airbag cushion according to claim 12, wherein the second traction element and the third traction element are each attached to the lateral first side of the seat frame.

14. The airbag cushion according to claim 12, wherein the second traction element is arranged above the first traction element, and the third traction element is arranged below the first traction element.

* * * * *